(12) United States Patent
Leitheiser

(10) Patent No.: US 7,865,575 B2
(45) Date of Patent: Jan. 4, 2011

(54) METHODS AND APPARATUS TO PERFORM FILE TRANSFERS IN DISTRIBUTED FILE SYSTEMS

(75) Inventor: Gregory Leitheiser, Irving, TX (US)

(73) Assignee: Sterling Commerce, Inc., Dublin, OH (US)

( * ) Notice: Subject to any disclaimer, the term of this patent is extended or adjusted under 35 U.S.C. 154(b) by 524 days.

(21) Appl. No.: 11/694,209

(22) Filed: Mar. 30, 2007

(65) Prior Publication Data

US 2008/0244030 A1 Oct. 2, 2008

(51) Int. Cl.
*G06F 15/16* (2006.01)
*G06F 11/00* (2006.01)

(52) U.S. Cl. .......................... 709/219; 714/43

(58) Field of Classification Search ................ 709/203, 709/204, 219, 217, 229, 201, 223, 227, 210–215; 707/9, 505, 3, 5, 509; 713/1, 100, 172, 159, 713/200, 201, 202; 711/115; 718/102, 104, 718/101; 370/235, 230; 714/43–46, 5
See application file for complete search history.

(56) References Cited

U.S. PATENT DOCUMENTS

| | | | |
|---|---|---|---|
| 5,745,679 A * | 4/1998 | Mercer ...................... | 707/203 |
| 5,991,774 A | 11/1999 | Tate et al. | |
| 5,995,982 A | 11/1999 | Mercer | |
| 6,389,422 B1 * | 5/2002 | Doi et al. .................... | 709/223 |
| 6,748,447 B1 | 6/2004 | Basani et al. | |
| 6,791,981 B1 | 9/2004 | Novaes | |
| 6,976,133 B1 | 12/2005 | Wynn et al. | |
| 7,054,910 B1 * | 5/2006 | Nordin et al. ............... | 709/208 |
| 7,117,264 B2 | 10/2006 | Becker et al. | |
| 7,155,487 B2 | 12/2006 | Yau et al. | |
| 2002/0188894 A1 * | 12/2002 | Goodman ..................... | 714/43 |
| 2003/0233455 A1 * | 12/2003 | Leber et al. ................. | 709/226 |
| 2005/0240994 A1 | 10/2005 | Burcham et al. | |
| 2005/0283525 A1 | 12/2005 | O'Neal et al. | |
| 2005/0283526 A1 | 12/2005 | O'Neal et al. | |
| 2006/0259607 A1 | 11/2006 | O'Neal et al. | |
| 2006/0285506 A1 * | 12/2006 | Kashyap ..................... | 370/271 |
| 2007/0147252 A1 * | 6/2007 | Kotzin ........................ | 370/235 |

OTHER PUBLICATIONS

U.S. Appl. No. 60/826,606, filed Aug. 2006, Sporny et al.*
Ghemawat et al. 'The Google File System', Oct. 19-22, 2003, ACM, pp. 1-15.*
"Google File System", downloaded on Jan. 8, 2007, from http://en.wikipedia.org/wiki/Google_File_System, 3 pages.

* cited by examiner

*Primary Examiner*—Nathan Flynn
*Assistant Examiner*—Mark O Afolabi
(74) *Attorney, Agent, or Firm*—Hanley, Flight & Zimmerman, LLC.

(57) ABSTRACT

An example method for sending a file includes sending a list of data nodes storing a first portion of the file and a second portion of the file to a master node of a destination distributed file system, computing a first checksum for a first portion of the file, computing a second checksum for a second portion of the file, sending the first checksum and the second checksum to the destination distributed file system, sending the first portion of the file to a first data node of the destination distributed file system, and sending the second portion of the file to a second data node of the destination distributed file system.

14 Claims, 10 Drawing Sheets

METHODS AND APPARATUS TO PERFORM FILE TRANSFERS IN DISTRIBUTED FILE SYSTEMS

FIELD OF THE DISCLOSURE

This disclosure relates generally to computer systems and, more particularly, to methods and apparatus to perform file transfers in distributed file systems.

BACKGROUND

Distributed file systems store data across multiple computing systems. An example distributed file system may include a master node controlling multiple data nodes. For example, a master node may divide a file into multiple portions (e.g., subsets, data blocks, contiguous file portions, etc.) and store the portions on the multiple data nodes. In addition, the master node may cause the same portion to be stored on two different data nodes. Storing the portions in multiple locations provides redundancy so the distributed file system can continue to function as long as at least one data node storing each portion is available.

Typically, the multiple computing systems of the distributed file system are connected via a communication network. For example, the communications network allows the master node to control the data nodes and allows data (e.g., portions of files) to be transferred amongst the data nodes. In addition, some or all of the computing systems of the distributed file system may be connected to a network of other devices such as, for example, the Internet.

One example distributed file system implementation is the Google File System developed by Google™.

DETAILED DESCRIPTION

Figure 1:
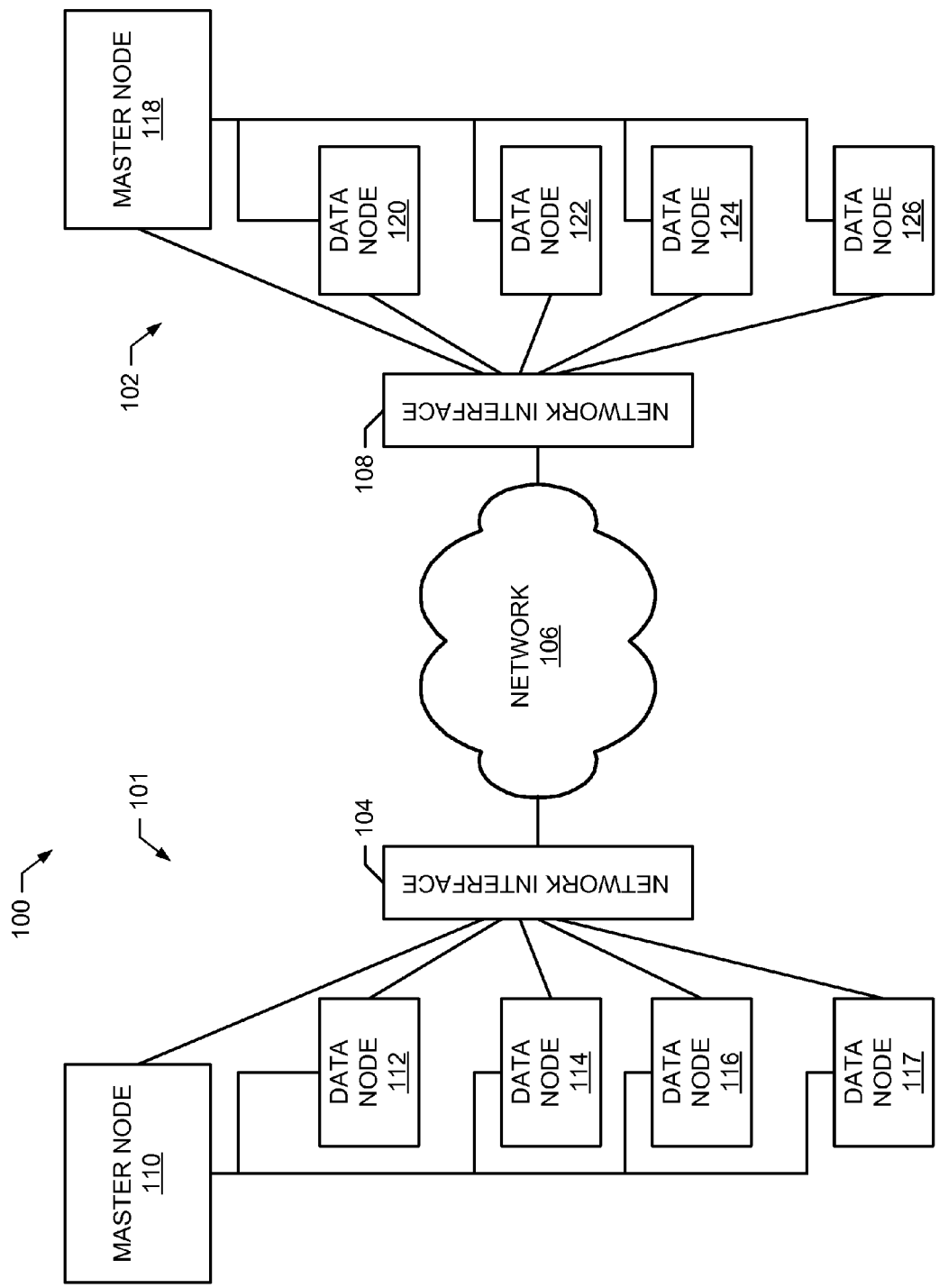
FIG. 1 is a block diagram of an example system for transferring data between distributed file systems.

FIG. 1 is a block diagram of an example system 100 for transferring data between distributed file systems. For example, the system 100 enables the transfer of a selected file from a local distributed file system 101 to a remote distributed file system 102, and vice versa. The example system 100 provides for multiple data nodes in the local distributed file system 101 to send portions (e.g., subsets, data blocks, contiguous file portions, etc.) of the selected file to multiple data nodes in the remote distributed file system 102. Accordingly, the example system 100 utilizes communication channels for each of the data nodes.

The system 100 of the illustrated example includes a local distributed file system 101, the remote distributed filed system 102, a first network interface 104, a network 106, and a second network interface 108, distributed file system 102. For ease of description, the local distributed file system 101 is referred to herein as local and the remote distributed file system 102 is referred to herein as remote. However, the location of the distributed file systems will vary depending on a particular implementation and/or the point of view of the observer. For example, both the local distributed file system 101 and the remote distributed file system 102 may be located at a single location.

The local distributed file system 101 includes a local master node 110, a first local data node 112, a second local data node 114, a third local data node 116, and a fourth local data node 117. The local master node 110 handles the distribution of data across the local data nodes 112-117. For example, a data file may be broken into portions and distributed across the local data nodes 112-117. Portions of the file may be distributed redundantly such that two of the local data nodes 112-117 store the same portion or segment of the data file. Persons of ordinary skill in the art will recognize that any number of data nodes, files, file portions may be used. In addition, any distribution of the file portions across the data nodes may be used. For example, some data nodes may store multiple file portions, some nodes may store one or more entire files, some nodes may store the same file or file portion as other nodes, etc.

The local distributed file system 101 may be any type of distributed file system such as, for example, a distributed file system implemented according to the Google File System (GFS) architecture.

The local master node 110 of the illustrated example manages the local distributed file system 101. The local master node 110 may act like a server when another master node (e.g., the remote master node 118) requests files. For example, the local master node 110 is a computer that manages the distribution of data across the local data nodes 112-117. In addition, the example local master node 110 instructions the local data nodes 112-117 to retrieve data from remote locations, to send data to remote locations, to accept connections from remote locations, etc. In addition, the local master node 110 of the illustrated example is capable of communicating with other computers such as, for example, other master nodes (e.g., the remote master node 118) associated with other distributed file systems (e.g., the remote distributed file system 102). For example, the local master node 110 may send requests for files to the remote master node 118, may receive requests for files from the remote master node 118, may send a list of information about the local distributed file system 101 to the remote master node 118, may receive a list of information about the remote distributed file system 102 from the remote master node 118, etc.

While the local master node 110 of the illustrated example is a dedicated computer that functions as the master node, the local master node 110 may alternatively be one of the local data nodes 112-117 that may function as a master node when the services of a master node are desired. In other words, one of the local data nodes 112-117 may function as an ad-hoc master node.

The local data nodes 112-117 of the illustrated example are computers that store data for the local distributed file system 101. The local data nodes 112-117 are capable of requesting a file or file portion from other computers (e.g., the remote data nodes 120-124) and sending a file or file portion to other computers (e.g., the remote data nodes 120-124). When the local data nodes 112-117 are sending files, the local data nodes 112-117 act as hosts. When the local data nodes 112-117 are requesting a file, the local data nodes 112-117 acts as clients. The local data nodes 112-117 are also capable of computing a checksum for a file or file portion and sending the checksum to the local master node 110. The local data nodes 112-117 of the illustrated example are communicatively coupled to the network 106 via the network interface 104, are communicatively coupled to each other, and are communicatively coupled to the master node 110.

Alternatively, any type of network topology may be used. For example, the local data nodes 112-117 and the master node 110 may be communicatively coupled via the network interface 104, the local data nodes 104 may be communicatively coupled to the network 106 via the master node 110, etc. While the local data nodes 112-117 are illustrated as separate computers, the local data nodes 112-117 may alternatively be implemented by a computer having redundant components (e.g., redundant hard drive, redundant processors, redundant network connections, etc.).

The network interface 104 of the illustrated example communicatively couples the local distributed file system 101 to the network 106. For example, the network interface 104 may be a cable modem, a digital subscriber line (DSL) connection, a channel service unit/data service unit (CSU/DSU) connected to a digital circuit, etc. While the network interface 104 is shown as having a single connection to the network 106, the network interface 104 may alternatively have multiple connections. For example, the network interface 104 may have a connection for each of the local data nodes 112-117 and the local master node 110. The network interface 104 may not be used when the local master node 110 and/or the local data nodes 112-117 connect directly to the network 106.

The network 106 of the illustrated example is a data network connecting the local distributed file system 101 to the remote distributed file system 102. For example, the network 106 may be a local area network, a wide area network, the Internet, etc. Alternatively, the local distributed file system 101 may be directly connected to the remote distributed file system 102.

The network interface 108 of the illustrated example communicatively couples the remote distributed file system 102 to the network 106. The network interface 108 is similar to the network interface 104 and, thus, the description is not repeated. In addition to the functionality described in conjunction with the description of the network interface 104, the example network interface 108 additionally includes a firewall. The firewall provides a security layer between the remote distributed file system 102 and devices connected to the network 106. To enable the local data node 124, the local data node 126, and the master node 118 to receive communication requests (e.g., a request to transfer a file or file portion) from the local distributed file system 101 (e.g., from the local master node 110 or the local data nodes 112-117). Alternatively, any other method of allowing devices connected to the network 106 to connect to devices in the remote distributed file system 102 may be used such as, for example, the method described in conjunction with FIG. 9.

The remote distributed file system 102 comprises a remote master node 118 and remote data nodes 120-124. The remote distributed file system 102 is similar to the local distributed file system 101 and, thus, is not described in further detail herein. Persons of ordinary skill in the art will recognize that while the remote distributed file system 102 and the local distributed file system 101 are illustrated with a single master node and four data nodes each any number of master nodes and data nodes may be included in each of the local distributed file system 101 and the remote distributed file system 102.

FIGS. 2-8 are flowcharts representative of example processes that may be executed to implement the example system 100 including the local distributed file system 101, the local master node 110, the local data nodes 112-117, the network interface 104, the network interface 108, the remote distributed file system 102, the remote master node 118, and the remote data nodes 120-124 of FIG. 1. The example processes of FIGS. 2-8 may be implemented using machine readable instructions executed by a processor, a controller, and/or any other suitable processing and/or logic devices. For example, the example processes of FIGS. 2-8 may be embodied in coded instructions stored on a tangible medium such as a flash memory, or random access memory (RAM) associated with a processor (e.g., the processor 1012 shown in the example processor platform 1000 and discussed below in conjunction with FIG. 10). Alternatively, some or all of the example processes of FIGS. 2-8 may be implemented using an application specific integrated circuit (ASIC), a programmable logic device (PLD), a field programmable logic device (FPLD), discrete logic, hardware, firmware, etc. In addition, some or all of the example processes of FIGS. 2-8 may be implemented manually or as combinations of any of the foregoing techniques, for example, a combination of firmware, software, and/or hardware. Further, although the example processes of FIGS. 2-8 are described with reference to the flowcharts of FIGS. 2-8, persons of ordinary skill in the art will readily appreciate that many other methods of implementing the example system 100 including the local distributed file system 101, the local master node 110, the local data nodes 112-117, the network interface 104, the network interface 108, the remote distributed file system 102, the remote master node 118, and the remote data nodes 120-124 may be employed. For example, the order of execution of the blocks may be changed, and/or some of the blocks described may be changed, eliminated, sub-divided, and/or combined. Additionally, persons of ordinary skill in the art will appreciate that the example processes of FIGS. 2-8 be carried out sequentially and/or carried out in parallel by, for example, separate processing threads, processors, devices, circuits, etc.

Figure 2:
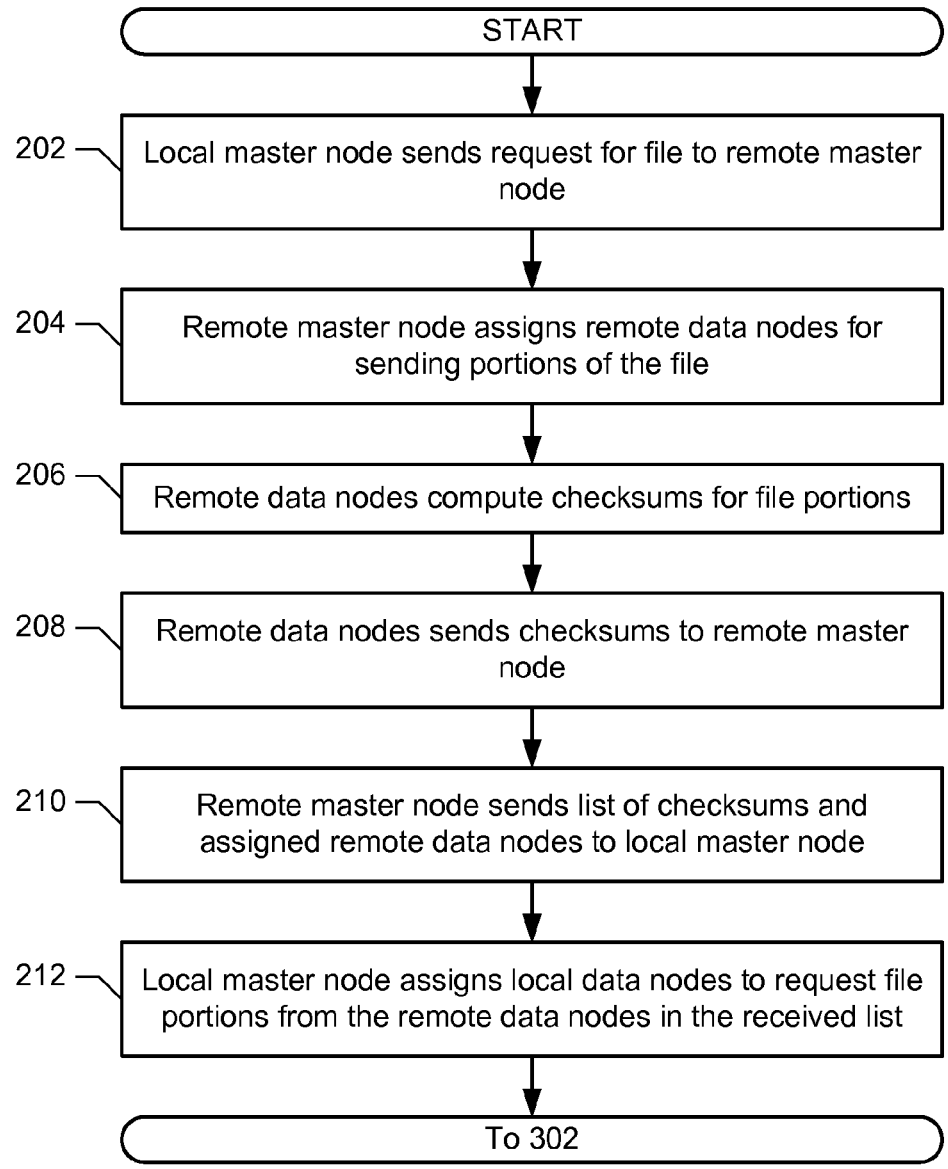
FIGS. 2-3 are flowcharts representative of example processes that may be executed to request and transfer a file from a source distributed file system to a destination distributed file system.
Figure 3:
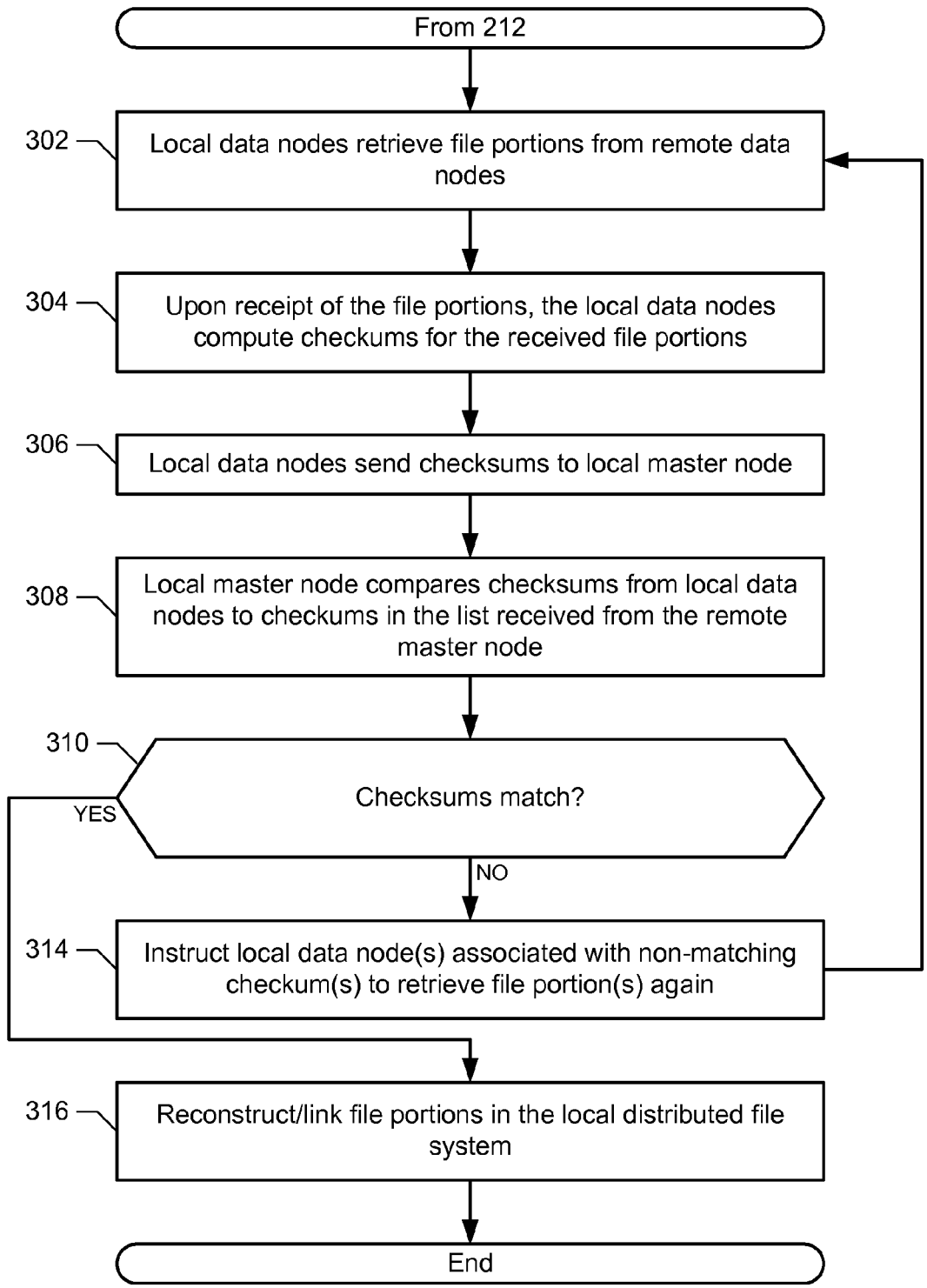

FIGS. 2-3 are flowcharts representative of example processes that may be executed to request and transfer a file from a source distributed file system (e.g., the remote distributed file system 102) to a destination distributed file system (e.g., local distributed file system 101). The example processes of FIG. 2 begin when a local master node (e.g., the local master node 110) sends a request for a file to a remote master node (e.g., the remote master node 118) (block 202). The remote master node 118 assigns one or more remote data nodes (e.g., remote data nodes 124 and 126) for sending portions of the requested file to the local distributed file system 101 (block 204). In the illustrated example, the remote data node 124 and the remote data node 126 together store the complete file (e.g., one half of the file (e.g., portion A) is stored with the remote data node 124 and one half of the file (e.g., portion B) is stored with the remote data node 126). Alternatively, any number of nodes may be used for sending portions of the file and/or any distribution of the file may exist.

After being assigned by the remote master node 118, the remote data node 124 and the remote data node 126 compute checksums for the portion of the file that they will be sending to the local distributed file system 101 (block 206). The checksum may be any type of signature of the file such as, for example, a hash value, a cyclic redundancy check, etc. The remote data node 124 and the remote data node 126 send the computed checksums to the remote master node 118 (block 208). The remote master node 118 sends a list of the checksums and the assigned remote data nodes (i.e., the remote data node 124 and the remote data node 126) to the local master node 110 (block 210).

After receiving the list of checksums and assigned remote data nodes, the local master node 110 assigns local data nodes to request the file portions from the remote data nodes in the received list. (e.g., the local data node 112 is assigned to retrieve portion A from the remote data node 124 and the local data node 114 is assigned to retrieve portion B from the remote data node 126) (block 212). In response to the assignment, the local data node 112 and the local data node 114 retrieve the file portions from the remote data nodes (block 302). For example, the local data node 112 and the local data node 114 may send a request for the file portions to the remote data node 124 and the remote data node 126 and the remote data node 124 and the remote data node 126 may, in response, send the file portions to the local data node 112 and the local data node 114.

Upon receiving the file portions, the local data node 112 and the local data node 114 compute checksums for the received file portions (block 304). For example, the local data node 112 will compute the checksum for the file portion that is received by the local data node 112. The local data node 112 and the local data node 114 then send the computed checksums to the local master node 110 (block 306).

After receiving the checksums from the local data node 112 and the local data node 114, the local master node 110 compares the checksums received in the list from the remote master node 118 with the checksums received the from local data node 112 and the local data node 114 (block 308). If any of the checksums do not match (e.g., a checksum purportedly for file portion A received from the local data node 112 does not match a checksum for file portion A identified in the list received from the remote master node 118), the local master node 110 instructs the data node or nodes associated with the non-matching checksum or checksums to retrieve the file portion again (block 314). Control then returns to block 302 to retrieve and verify the file portion again.

Figure 4:
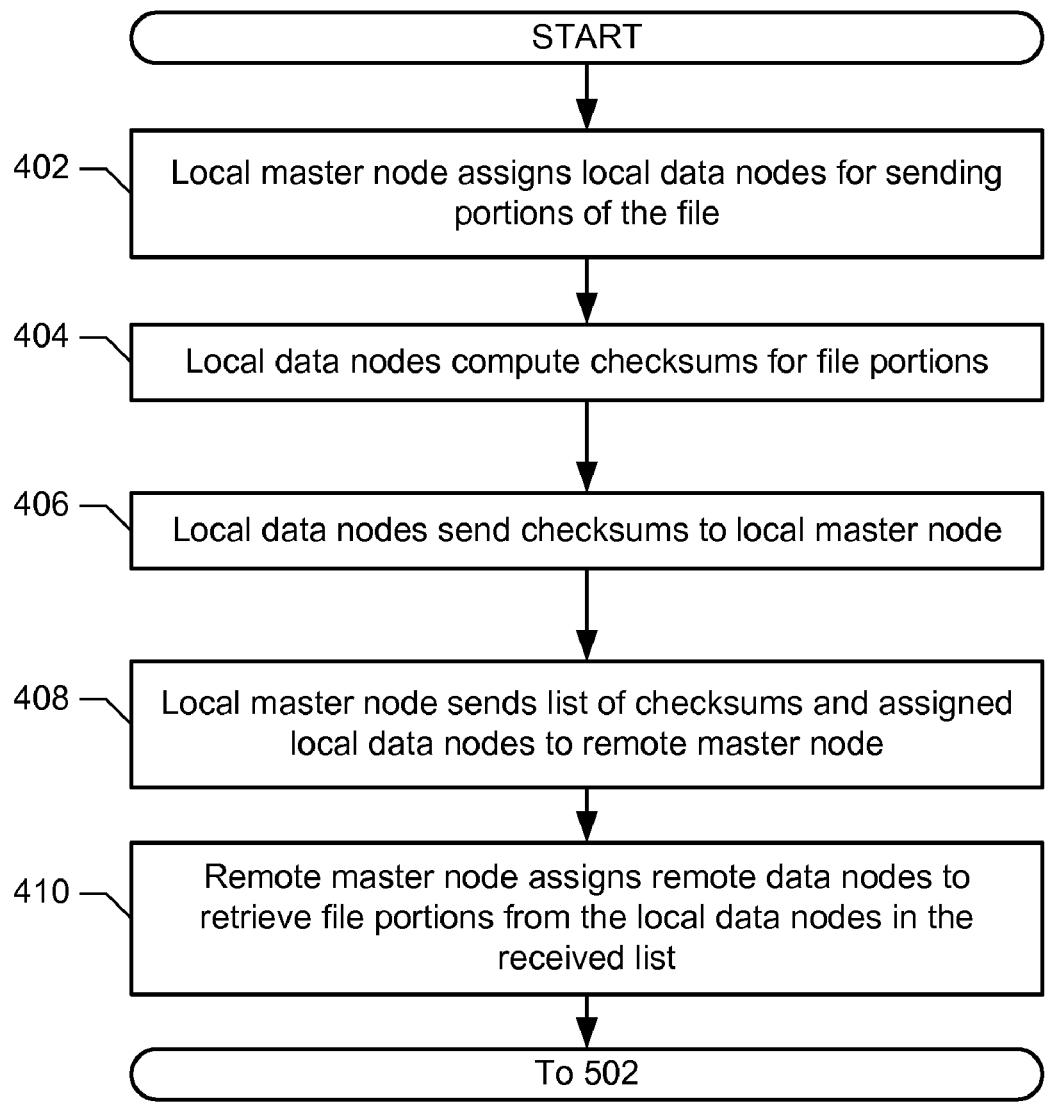
FIGS. 4-5 are flowcharts representative of example processes that may be executed to transfer a file from a source distributed file system to a destination distributed file system.
Figure 5:
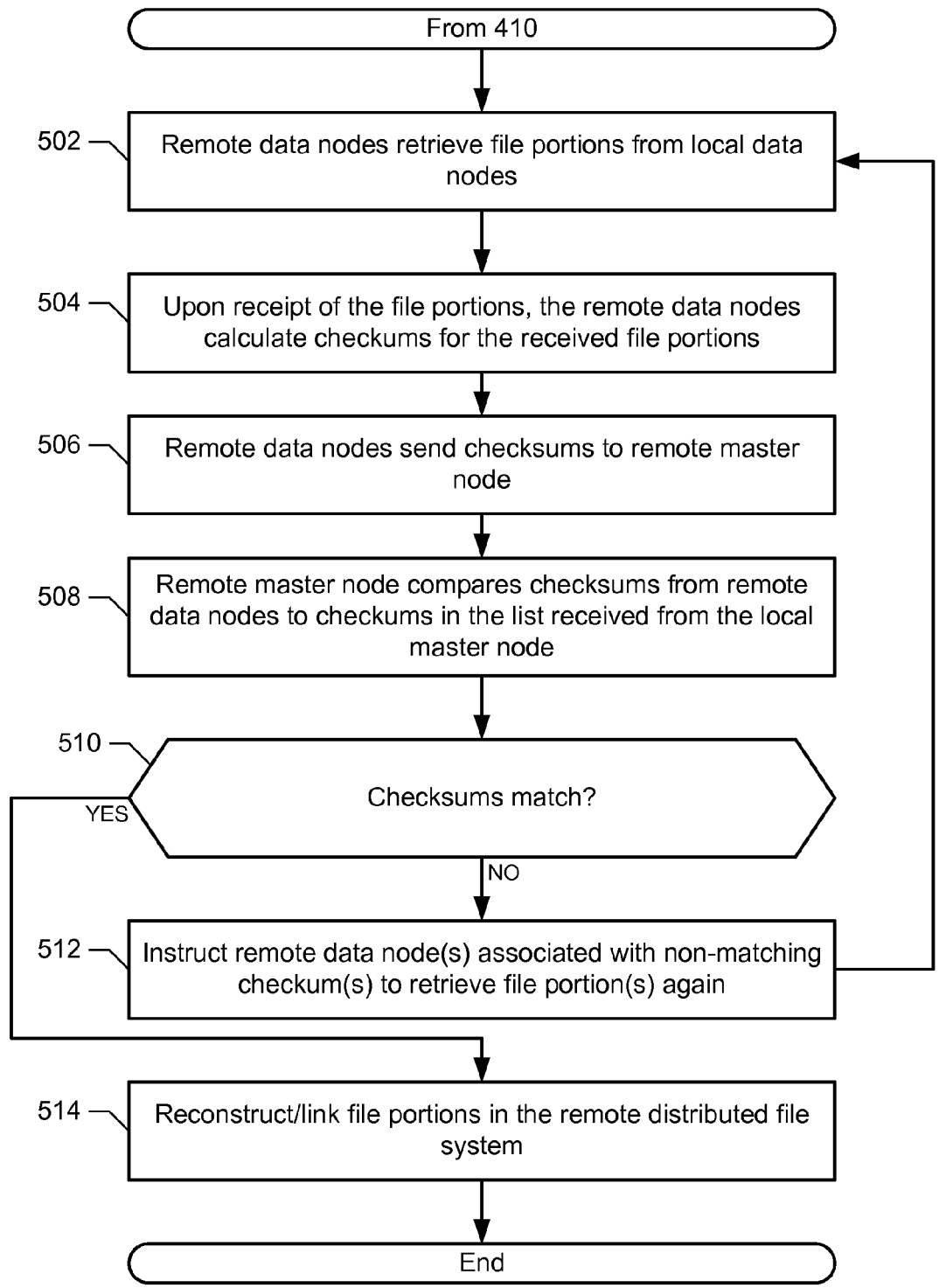

If there are no non-matching checksums (block 310), the local distributed file system 101 reconstructs the requested file using the file portions retrieved by the local data node 112 and the local data node 114. For example, the local master node 110 may instruct the local data nodes 112-117 to store the file portions. In such an example, the local master node 110 may instruct the local data node 112 and the local data node 116 to store portion A of the file and instruct local data node 114 and local data node 117 to store portion B of the file. Further, the local master node 110 may cause the file portions to be linked to each other such that each file portion links to its adjoining file portions. For example, portion A may link to portion B and portion B may link to portion A. The linking of file portions may be handled in any way based on the type of distributed file system. For example, the file portions may be linked using a link table that stores the linking of the data, by embedding a link in the file portion, etc. FIGS. 4-5 are flowcharts representative of example processes that may be executed to transfer a file from a source distributed file system (e.g., the local distributed file system 101) to a destination distributed file system (e.g., remote distributed file system 102). The example processes of FIG. 4 begin when a local master node (e.g., the local master node 110) assigns local data nodes (e.g., the local data node 116 and the local data node 117) for sending portions of the file to the remote distributed file system 102 (block 402). The local data node 116 and the local data node 117 compute checksums for the file portions that they will respectively send (block 404). The local data node 116 and the local data node 117 send the computed checksums to the local master node 110 (block 406). The local master node 110 generates a list of checksums and the assigned local data nodes and sends the list to a remote master node (e.g., the remote master node 118) (block 408).

Upon receiving the list of checksums and assigned local data nodes, the remote master node 118 assigns remote data nodes (e.g., the remote data node 120 and the remote data node 122) to retrieve the portions of the file (e.g., a first portion A and a second portion B) from the local data nodes in the list (block 410). In response to the assignment, the remote data node 120 and the remote data node 122 retrieve the file portions from the local data node 116 and the local data node 117 (block 502). Once the transfer of a file portion completes at a remote data node (e.g., the remote data node 120), the remote data node computes a checksum for the received file portion (block 504). The remote data node 120 and the remote data node 122 send the computed checksums to the remote master node 118 (block 506).

Upon receipt of the computed checksums from the remote data node 120 and the remote data node 122, the remote master node 118 compares the checksums received from the local master node 110 with the checksums received from the remote data node 120 and the remote data node 122 (block 508). The remote master node 118 determines if the associated checksums (e.g., the checksum for file portion A received from the local master node 110 and the checksum for the file portion A received from the local data node 120) match (block 510). If the associated checksums do not match, the remote master node 118 instructs the remote data node or nodes associated with the non-matching file portion or portions to retrieve the file portion or portions again (block 512). Control then returns to block 502 to retrieve and verify the file portion.

If all associated checksums match (block 510), the remote master node 118 reconstructs and/or links the requested file using the file portions retrieved by the remote data node 120 and the remote data node 124.

Figure 6:
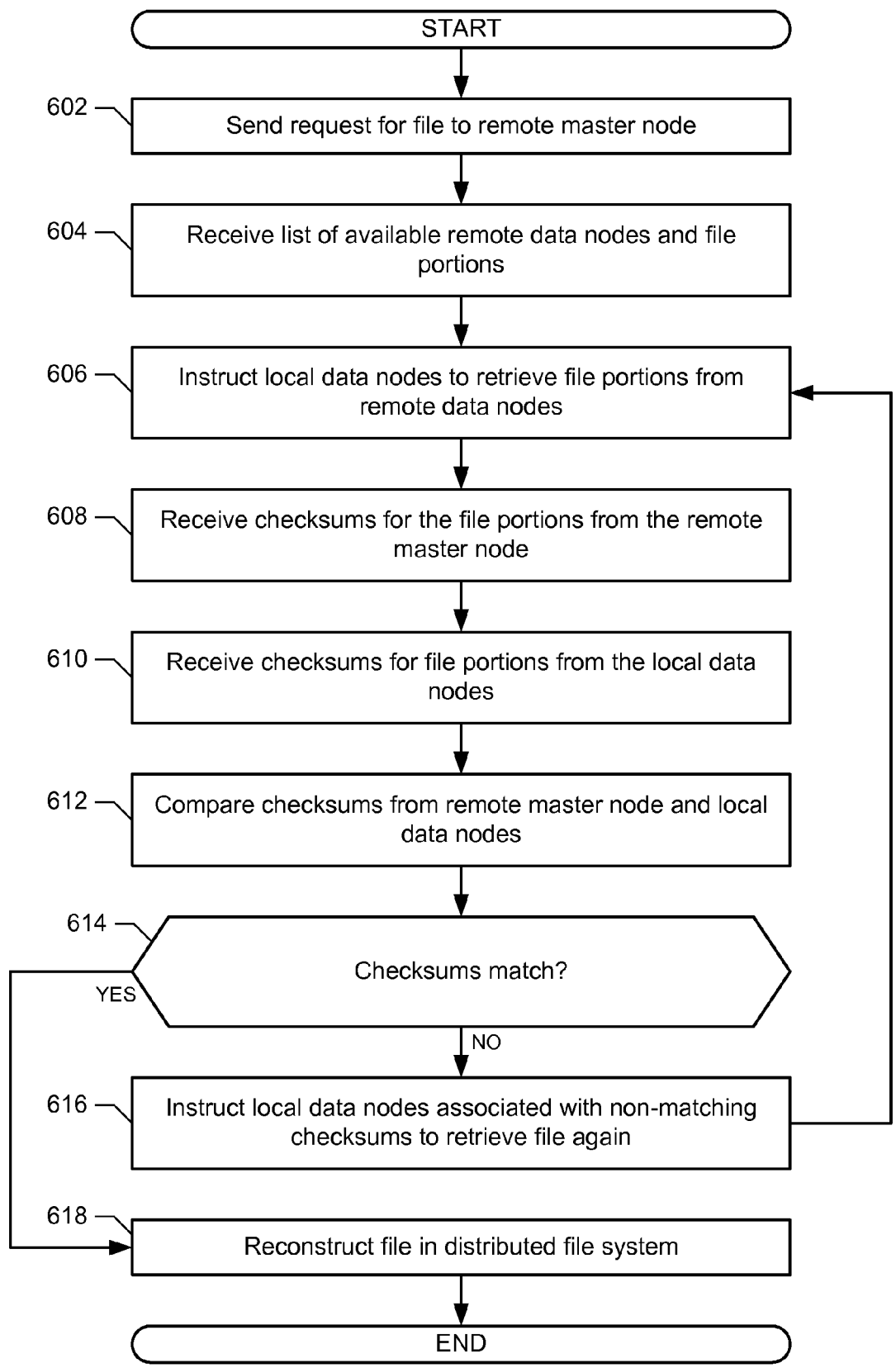
FIG. 6 is a flowchart representative of example processes that may be executed to implement requesting a file by a master node of FIG. 1.

FIG. 6 is a flowchart representative of example processes that may be executed to implement requesting a file by a master node (e.g., the local master node 110). The example processes of FIG. 6 begin when the local master node 110 sends a request for a file to another master node (e.g., the remote master node 118) (block 602). The local master node 110 receives a list of available remote data nodes (e.g., the remote data node 124 and the remote data node 126) and the associated file portions (block 604). The local master node 110 instructs local data nodes (e.g., the local data node 112 and the local data node 114) to retrieve the file portions from the remote data node 124 and the remote data node 126 (block 606). The local master node 110 then receives checksums for the file portions to be retrieved from the remote master node 118 (block 608). While a particular order for blocks 606 and 608, these blocks, like any other blocks of the flowcharts described herein may be changed. In addition, checksums received in block 608 may alternatively be received in the list received in block 604.

Following the completion of the file portion retrieval by the local data nodes, the local master node 110 receives checksums computed for the file portions by the local data nodes (block 610). The local master node 110 compares the checksums received from the local data nodes to the checksums received from the remote master node 118 (block 612). The local master node 110 determines if associated checksums match (block 614). If one or more associated checksums do not match, the local master node 110 instructs the local data nodes to retrieve the file portions associated with the non-matching checksums again (block 616). Control then returns to block 606 to retrieve and verify the file portions If all of the checksums match (block 614), the local master node 110 reconstructions and/or links the file portions in the local distributed file system 101.

Figure 7:
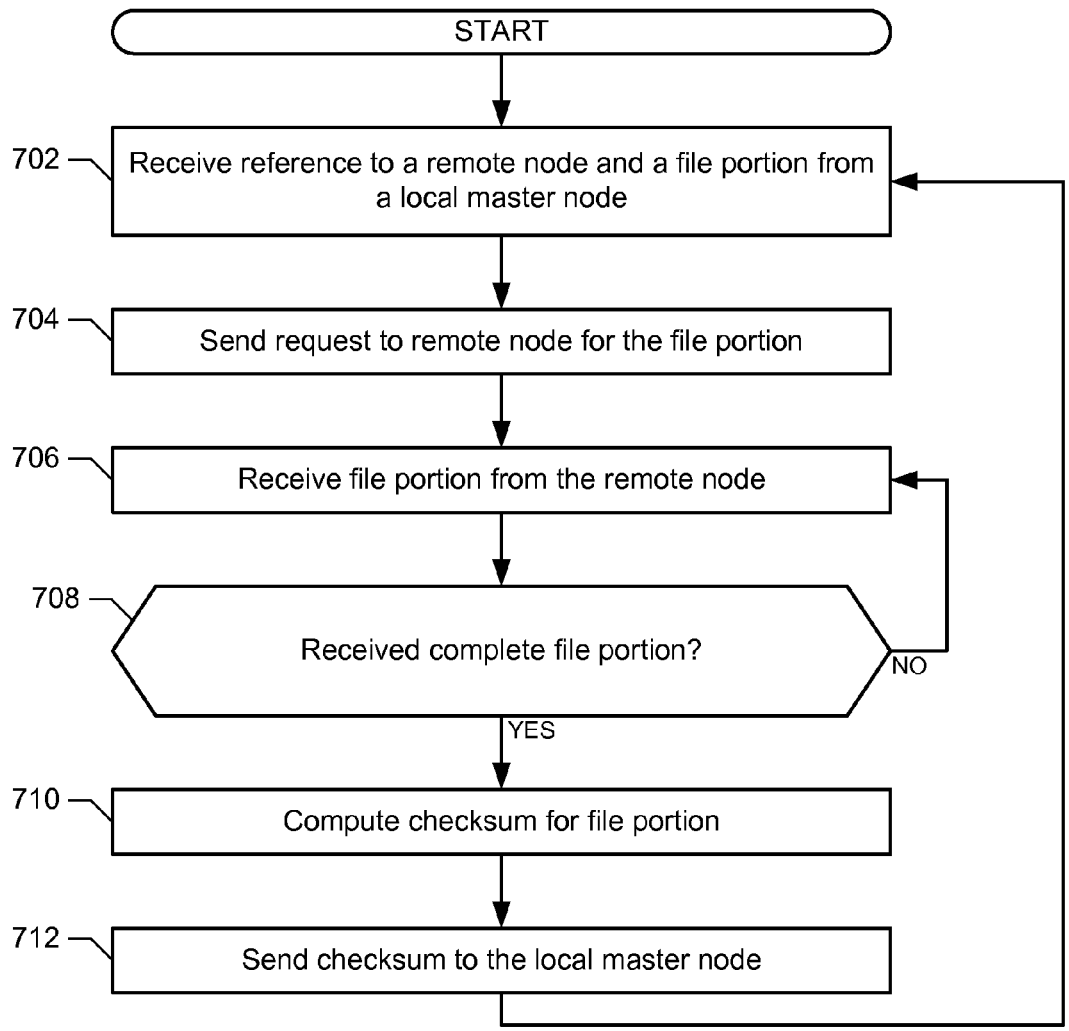
FIG. 7 is a flowchart representative of example processes that may be executed to implement the data nodes of FIG. 1.

FIG. 7 is a flowchart representative of example processes that may be executed to implement data nodes (e.g., the local data node 112). The example processes of FIG. 7 begin when the local data node 112 receives a reference to a data node (e.g., the remote data node 120) and a file portion from a master node (e.g., the local master node 110) (block 702). The local data node 112 sends a request for the identified file portion to the remote data node 120 (block 704). In response to the request, the local data node 112 receives a file portion from the remote data node 120 (block 706). The local data node 112 determines if the entire file portion has been received (block 708). For example, the local data node 112 may compare the size of the received data to a known size of the received file portion, may determine if a connection has been closed by the remote data node 120, etc. If the local data node 112 determines that the complete file portion has not been received, control returns to block 706 to continue receiving the file portion. Alternatively or additionally, the local data node 112 may determine if the time spent receiving the file has exceeded a predetermined time limit or any other error has occurred (e.g., the connection used to retrieve the file was disrupted). If the time limit has been exceeded or an error has occurred, control may proceed to block 710 regardless of whether the local data node 112 determines that the file portion has been completely received. After an error has occurred, the local master node 110 may assign the same or a different data node to retrieve the file again. In addition, the local master node 110 may notify a remote master node of the error and the remote master node may assign the previously assigned remote data node to send the file or may assign a different remote data node to send the file. In the case that a different remote data node is assigned, the remote master node may communicate a reference to the new remote data node to the local master node 110, which will instruct the assigned local data node to retrieve the file from the new remote data node.

If the local data node 112 determines that the receipt of the file portion has completed, the local data node 112 computes a checksum for the received file portion (block 710). The local data node 112 sends the computed checksum to the local master node 110 (block 712). Control then returns to block 702 to await the next file transfer request. For example, the next file transfer request may be received from the local master node 110 if the local master node 110 determines that the file portion was not valid (e.g., the computed checksum does not match a checksum received from the remote data distributed file system.

Figure 8:
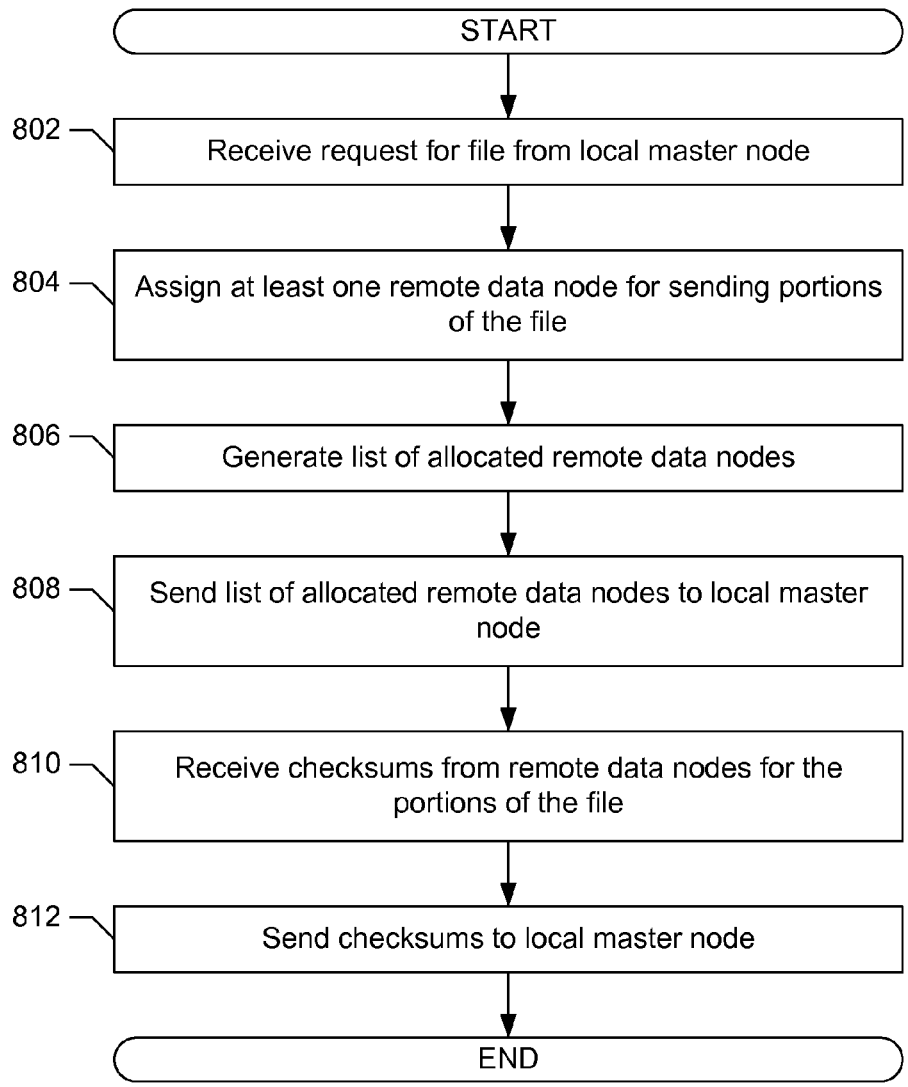
FIG. 8 is a flowchart representative of example processes that may be executed to implement the remote master node of FIG. 1.

FIG. 8 is a flowchart representative of example processes that may be executed to implement the remote master node 118. In particular, the machine readable instructions of FIG. 8 implement the handling of a request to transfer a file received from another master node (e.g., the local master node 110 of the local distributed file system 101). The example machine readable instructions of FIG. 8 begin when the remote master node 118 receives a request for a file from the local master node 110 (block 802). In response to the request, the remote master node 118 assigns one or more remote data nodes (e.g., the remote data node 120 and the remote data node 122) for sending portions of the file (block 804). The remote master node 118 generates a list of the assigned remote data nodes (e.g., the list may include the file portion available from the remote data node, a network address of the remote data node, authentication parameters for the remote data node, a time frame during which the remote data node will accept connections, etc.) (block 806). The remote master node 118 sends the generated list to the local master node 110 (block 808).

The remote master node 118 receives checksums for the file portions from the remote master nodes (block 810). The remote master node 118 then sends the checksums to the local master node 110 for validation of the file portions. While a particular order for blocks 808-812 is illustrated, the order of the blocks, like the other blocks of the illustrated flowcharts, may be changed. In addition, the checksums may be added to the list sent in block 808 and, thus, a separate block 812 will not be implemented.

Figure 9:
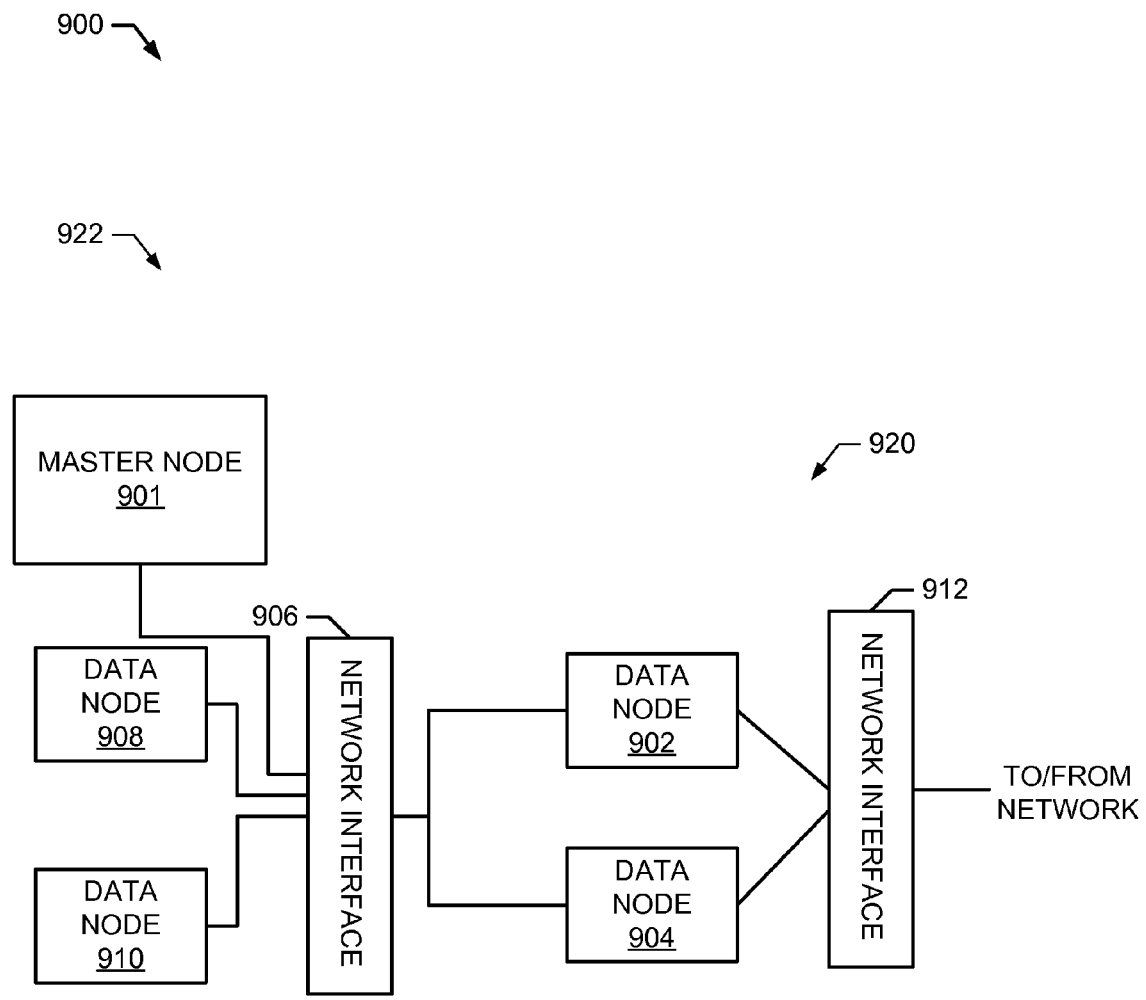
FIG. 9 is a block diagram of an example implementation of a distributed file system that may be used to transfer or receive data from another distributed file system.

FIG. 9 is a block diagram of an example implementation of a distributed file system 900 that may be used to transfer or receive data from another distributed file system (e.g., the remote distributed file system of FIG. 1). The distributed file system 900 of the illustrated example includes a master node 901, a data node 902, a data node 904, a network interface 906, a data node 908, a data node 910, and a network interface 912.

The distributed file system 900 is similar to the local distributed file system 101 and the remote distributed file system 102. Accordingly, the description of similar devices and components is not repeated.

In general, the example distributed file system 900 comprises a public portion 920 and a private portion 922. The public portion 920 includes devices that are available to the network (e.g., the internet). The private portion 922 includes devices that are not directly available to the public. In the illustrated example, the public portion 920 comprises the data node 902, the data node 904, and the network interface 912. The private portion 922 comprises the master node 901, the network interface 906, the data node 908, and the data node 910.

The network interface 912 and the network interface 906 communicatively couple the devices connected to each network interface. For example, the network interface 906 communicatively couples the data node 908, the data node 910, and the master node 901 to the data node 902, and the data node 904. The network interface 912 and the network interface 906 of the illustrated example include firewalls that restrict data communications that pass through the network interfaces. For example, the network interface 906 may be configured to only allow communications from the master node 901, the data node 902, and the data node 904 to pass to the data node 908 and the data node 910. In other words, even if the network interface 906 was connected to the network interface 912, the network interface 906 of the illustrated example would prevent any communications received from the internet from passing to the data node 908 and the data node 910.

The devices in the public portion 920 are capable of receiving requests (e.g., a request for a file portion, a request to send a file, a request to retrieve a file, etc.) from devices on the network. For example, if the distributed file system 900 is connected to a network with the local distributed file system 101 of FIG. 1, the data node 902 may receive a request from the local data node 112 for a file portion. To allow data stored in the data node 908 and the data node 910 to be transferred to other distributed file systems (e.g., the local distributed file system 101 of FIG. 1). The data node 902 and the data node 904 may act as proxies for the data node 908, the data node 910, and the master node 901. For example, the data node 902 may receive requests associated with the data node 908 and may pass the request to the data node 908. When the data node 908 responds to the request (to the data node 902), the data node 902 passes the response to the device on the network that made the request. In other words, the data node 902 acts as a pass-through proxy for the data node 902. In an alternate implementation, the data node 902 may receive a request for a file portion stored on the data node 908. In response to the request, the data node 902 may request that the file be temporarily or permanently transferred to the data node 902. The data node 902 will then act as the source for the data and will transfer the data to the device on the network that requested the data. In another example, the data node 902 may receive a file transfer request from the master node 901 that is directed for the master node of another distributed file system (e.g., the remote file system 102 of FIG. 1). The data node 902 will pass-through the request and/or generate a similar request and send the request to designated destination. Any response that is received by the data node 902 will then be passed to the master node 901. For example, if the master node of the other distributed file system sends a list of data nodes and checksums, the data node 902 will transfer the list of data nodes and checksums to the master node 901. The forgoing scenarios are examples and any type of configurations and methods for handling the public portion 920 and the private portion 922 may be used.

Persons of ordinary skill in the art will recognize that there are many ways of implementing a secure or insecure network. The network implementations described herein are provided as examples and any type of network implementation may be used.

Figure 10:
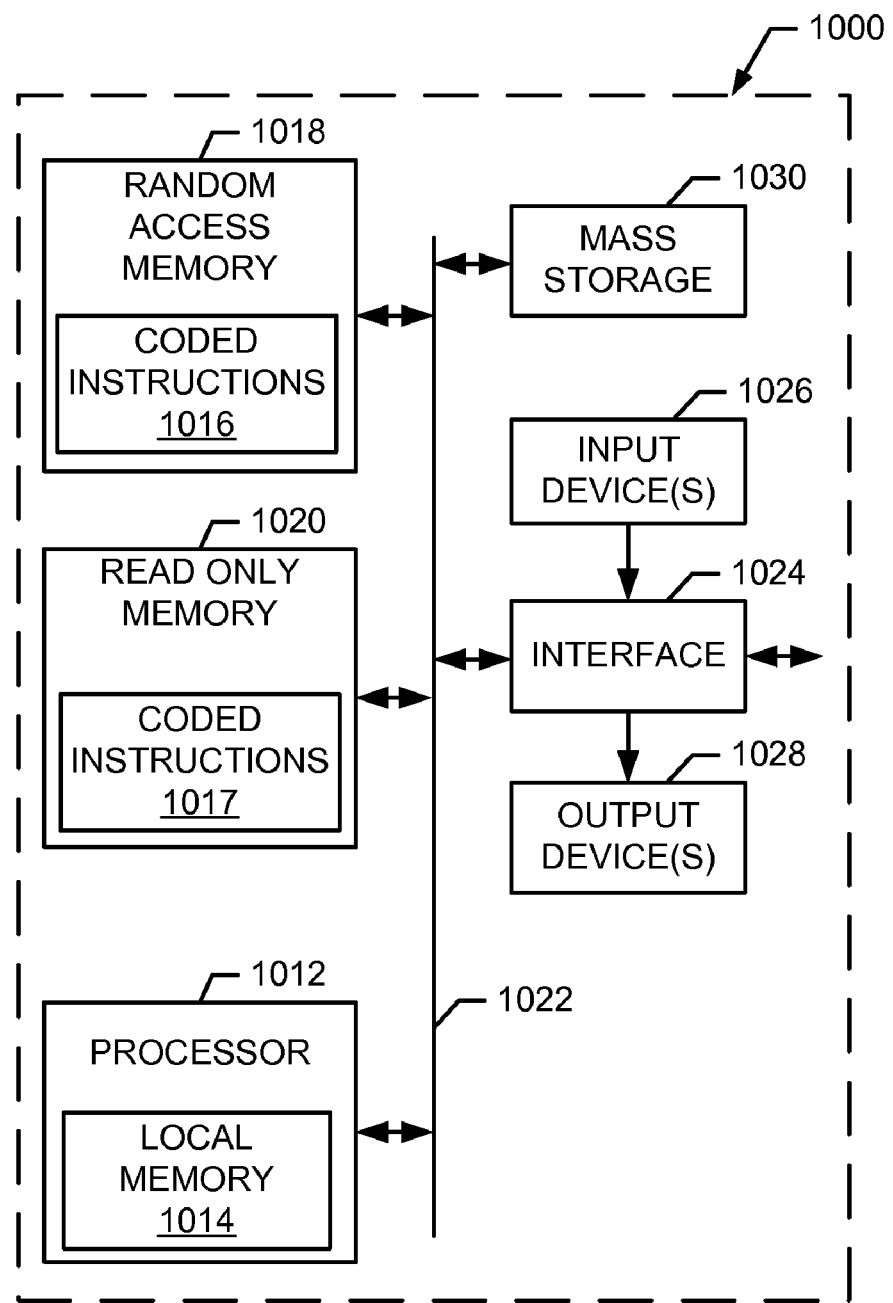
FIG. 10 is a block diagram of an example computer that may be used and/or programmed with machine readable instructions to implement the example processes of FIGS. 2, 3, 4, 5, 6, 7, and/or 8 to implement the example system of FIG. 1.

FIG. 10 is a block diagram of an example computer platform 1000 capable of executing the machine readable instructions illustrated in FIGS. 2, 3, 4, 5, 6, 7, and/or 8 to implement the example system 1000 including the local distributed file system 101, the local master node 110, the local data nodes 112-117, the network interface 104, the network interface 108, the remote distributed file system 102, the remote master node 118, the remote data nodes 120-124, and/or the other apparatus and/or methods disclosed herein.

The computer platform 1000 of the instant example includes a processor 1012 such as a general purpose programmable processor. The processor 1012 includes a local memory 1014, and executes coded instructions 1016 present in random access memory 1018, coded instruction 1017 present in the read only memory 1020, and/or instructions present in another memory device. The processor 1012 may execute, among other things, the machine readable instructions represented in FIGS. 2, 3, 4, 5, 6, 7, and/or 8. The processor 1012 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1012 is in communication with a main memory including a volatile memory 1018 and a non-volatile memory 1020 via a bus 1025. The volatile memory 1018 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown) in a conventional manner.

The computer platform 1000 also includes a conventional interface circuit 1024. The interface circuit 1024 may be implemented by any type of well known interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, isopoint and/or a voice recognition system.

One or more output devices 1028 are also connected to the interface circuit 1024. The output devices 1028 can be implemented, for example, by display devices (e.g., a liquid crystal display, a cathode ray tube display (CRT), a printer and/or speakers). The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer platform 1000 also includes one or more mass storage devices 1030 for storing software and data. Examples of such mass storage devices 1030 include floppy disk drives, hard drive disks, compact disk drives and digital versatile disk (DVD) drives.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method for sending a file from a source distributed file system to a destination distributed file system, the method comprising:
    sending a list of data nodes storing a first portion of the file and a second portion of the file to a master node of the destination distributed file system;
    computing a first checksum for a first portion of the file at a first data node of the source distributed file system;
    sending the first checksum from the first data node of the source distributed file system to a master node of the source distributed file system;
    computing a second checksum for a second portion of the file at a second data node of the source distributed file system;
    sending the second checksum from the second data node of the source distributed file system to the master node of the source distributed file system;
    sending the first checksum and the second checksum from the master node of the source distributed file system to the master node of the destination distributed file system, wherein the master node of the destination distributed file system sends the first checksum to a third data node of the destination distributed file system and the second checksum to a fourth data node of the destination distributed file system;
    receiving a first request for the first portion from a third data node of the destination distributed file system at the first data node of the source distributed file system;
    in response to the first request, sending the first portion of the file to the third data node of the destination distributed file system from the first data node of the source distributed file system, wherein the third data node of the destination distributed file system is assigned by the master node of the destination distributed file system;
    receiving a second request for the first portion from a fourth data node of the destination distributed file system at the second data node of the source distributed file system; and
    in response to the second request, sending the second portion of the file to the fourth data node of the destination distributed file system from the second data node of the source distributed file system, wherein the fourth data node of the destination distributed file system is assigned by the master node of the destination distributed file system.

2. A method as defined in claim 1, wherein the data nodes in the list of data nodes are associated with the source distributed file system.

3. A method as defined in claim 1, further comprising receiving a request for a file from the master node of the destination distributed file system.

4. A method as defined in claim 1, wherein the list of data nodes identifies a third data node of the source distributed file system and a fourth data node of the source distributed file system.

5. A method as defined in claim 1, wherein computing the first checksum is performed by the first data node.

6. A method as defined in claim 1, wherein sending the list of data nodes is performed by a master node of the source distributed file system associated with the data nodes in the list of data nodes.

7. A system for sending a file, the system comprising:
    a first data node of a source distributed file system to compute a first checksum for a first portion of the file, to send the first checksum to a master node of the source distributed file system, to receive a request for the first portion of the file from a third data node of a destination distributed file system, and to send the first portion of the file to the third data node of the destination distributed file system;
    a second data node of the source distributed file system to compute a second checksum for a second portion of the file, to send the second checksum to the master node of the source distributed file system, to receive a request for the second portion of the file from a fourth data node of a destination distributed file system, and to send the second portion of the file to the fourth data node of the destination distributed file system;
    the master node of the source distributed file system to send a list of data nodes storing the first portion of the file and the second portion of the file to the destination distributed file system and to send the first checksum and the second checksum to the destination distributed file system, wherein at least one of the first data node, the second data node, and the master node includes a tangible processor;
    a network interface associated with the destination distributed file system to communicatively couple the master node, the first data node, and the second data node to the destination distributed file system, wherein the network interface is to allow the first data node and the second data node to access the third data node and the fourth data node; and
    a fifth data node associated with the destination distributed file system.

8. A system as defined in claim 7, wherein the first data node and the second data node are associated with a source distributed file system.

9. A system as defined in claim 7, wherein the master node is further to receive a request for a file from the destination distributed file system.

10. A system as defined in claim 7, wherein the list of data nodes identifies the first data node and the second data node.

11. A system as defined in claim 7, wherein the network interface is to prevent access to the fifth data node by the first data node and the second data node.

12. An article of manufacture storing machine readable instructions which, when executed, cause a machine to:
    receive a list of host machines from a server at a master node of a source distributed file system;
    instruct a first client to request a first portion of data from a first host machine identified in the list of host machines at the master node and to compute a first checksum for the first portion of the data;
    instruct a second client different from the first client to request a second portion of the data different from the first portion of the data from a second host machine identified in the list of host machines at the master node and to compute a second checksum for the second portion of the data;

receive the first checksum from the first client and the second checksum from the second client at the master node;

receive a third checksum for the first portion of the data and a fourth checksum for the second portion of the data from the source distributed file system; compare the first checksum and the third checksum; compare the second checksum and the fourth checksum;

determine that the data has been successfully received based on the comparison of the first checksum to the third checksum and the second checksum to the fourth checksum; and instruct the first client to retransmit the request for the first portion of the data from the first host machine identified in the list of host machines.

13. An article of manufacture as defined in claim 12, wherein the machine readable instructions further cause the machine to receive a list of checksums associated with the host machines.

14. An article of manufacture as defined in claim 12, wherein the machine readable instructions further cause the machine to send a file transfer request to the server.

* * * * *